(12) United States Patent
Tremp et al.

(10) Patent No.: US 10,844,924 B2
(45) Date of Patent: Nov. 24, 2020

(54) TUBE CATCHER FOR A HOT FORMING MACHINE AND HOT FORMING MACHINE

(71) Applicant: SCHOTT Schweiz AG, St. Gallen (CH)

(72) Inventors: Marcel Tremp, Speicher (CH); Michael Scheidbach, Hauptwil (CH)

(73) Assignee: SCHOTT SCHWEIZ AG, St. Gallen (CH)

( * ) Notice: Subject to any disclaimer, the term of this patent is extended or adjusted under 35 U.S.C. 154(b) by 0 days.

(21) Appl. No.: 16/252,029

(22) Filed: Jan. 18, 2019

(65) Prior Publication Data
US 2019/0219121 A1 Jul. 18, 2019

(30) Foreign Application Priority Data
Jan. 18, 2018 (DE) .......................... 10 2018 101 084

(51) Int. Cl.
| | |
|---|---|
| *F16F 9/04* | (2006.01) |
| *C03B 23/11* | (2006.01) |
| *C03B 23/045* | (2006.01) |
| *B65G 29/00* | (2006.01) |
| *C03B 35/04* | (2006.01) |

(52) U.S. Cl.
CPC .............. *F16F 9/04* (2013.01); *B65G 29/00* (2013.01); *C03B 23/045* (2013.01); *C03B 23/114* (2013.01); *C03B 35/04* (2013.01); *F16F 2222/126* (2013.01); *F16F 2230/0023* (2013.01)

(58) Field of Classification Search
CPC .................. C03B 23/045; C03B 23/11; C03B 23/112–118; C03B 35/04; F16F 9/0472
See application file for complete search history.

(56) References Cited

U.S. PATENT DOCUMENTS

| | | | | |
|---|---|---|---|---|
| 1,981,692 A | | 11/1934 | Dichter | |
| 4,092,142 A | * | 5/1978 | Dichter | ................. C03B 23/112 65/159 |
| 4,226,607 A | * | 10/1980 | Domken | ................. A61J 1/065 65/105 |
| 5,034,184 A | * | 7/1991 | Stevens | ................... G21C 7/16 376/231 |

FOREIGN PATENT DOCUMENTS

| | | |
|---|---|---|
| CN | 2675661 | 2/2005 |
| CN | 201990593 | 9/2011 |

* cited by examiner

*Primary Examiner* — Lisa L Herring
(74) *Attorney, Agent, or Firm* — Ohlandt, Greeley, Ruggiero & Perle, L.L.P.

(57) ABSTRACT

The present disclosure provides a tube catcher for a hot forming machine comprising a foot for mounting the tube catcher in the hot forming machine, an upper contact surface for catching a glass tube as it falls into the hot forming machine, and a damping element, which is arranged below the upper contact surface in such a way that it allows the upper contact surface to elastically recede in the direction of the falling direction of the glass tube. This minimizes damage to glass tubes on impact and permits a high production speed. For this purpose, the damping element includes a compressible chamber that can be filled with a gas.

16 Claims, 5 Drawing Sheets

TUBE CATCHER FOR A HOT FORMING MACHINE AND HOT FORMING MACHINE

CROSS-REFERENCE TO RELATED APPLICATION

The present application claims the benefit under 35 U.S.C. § 119 of German Patent Application 10 2018 101 084.2, filed on Jan. 18, 2018, which is herein incorporated by reference.

BACKGROUND OF THE DISCLOSURE

1. Field of the Disclosure

The present disclosure relates to a tube catcher for a hot forming machine, comprising a foot for fixing the tube catcher in the hot forming machine, an upper contact surface for catching a glass tube as it falls into the hot forming machine, and a damping element, which is arranged below the contact surface in such a way that it allows an elastic receding of the contact surface in the direction of the falling direction of the glass tube. It also relates to a process for catching a glass tube in a hot forming machine and a hot forming machine.

2. Discussion of the Related Art

Hot forming machines of the type mentioned above are used for the automated processing of glass in several, usually circularly arranged processing stations. They usually have a preloading rim on their upper side, into which a glass tube of approximately 1.5 m length is inserted in a preloading position. The glass tube then falls down at a defined point, e.g. by pushing from the pre-loading position via a corresponding opening through a holding chuck, and is then fixed by the clamping jaws of the holding chuck so that the glass tube protrudes a certain length downwards beyond the holding chuck. At the open end projecting downwards, the tube glass is subjected to certain processing operations which are carried out at different processing stations. For this purpose, an upper segment of the machine and the chucks are rotated by a certain angle from one machining position to the next. This is done at a given clock speed.

In order to avoid the glass tube being damaged when falling from the preloading rim, a tube catcher is arranged below the drop point, i.e. below the chuck through which the glass tube falls. It has a flat contact surface under which a damping element is arranged. The damping element is designed for mechanical damping, so that the contact surface elastically moves back in the direction of the fall on impact of the glass tube. Today's tube catchers are generally constructed in such a way that the contact surface and damping element are formed in one piece from a sponge-like or rubber-like material. In the prior art, the same damping element is used for glass tubes of different dimensions and weights.

However, the disadvantage of the well-known tube catcher is that damage to the glass tubes can still occur in the event of an impact. In addition, it has turned out that when the production speed is increased, there are problems with the exact positioning of the glass tubes for further processing.

SUMMARY OF THE DISCLOSURE

It is therefore the problem of the present disclosure to specify a tube catcher and a method of the type mentioned above which minimize damage to glass tubes on impact and permit a high production speed.

This problem is solved according to the present disclosure with regard to the tube catcher by the damping element comprising a compressible chamber which can be filled with a gas.

With regard to the method, the problem is solved by the following steps:

arranging of an upper contact surface and a damping element arranged below the contact surface in such a way that it allows the contact surface to elastically recede in the direction of the falling direction of the glass tube, below the glass tube, filling a compressible chamber in the damping element with a gas, and dropping the glass tube.

The present disclosure is based on the consideration that in particular the problem of positioning the glass tube at high processing speeds arises from the fact that the glass tubes elastically recoil on impact with the contact surface, causing a vibration around the desired end position that is difficult to predict. If the clock rate of the hot forming machine is increased, the glass tube is already fixed in the holding chuck during this rebounce process, so that the positioning becomes inaccurate. A damping element should therefore be provided which has a more sensitive response and a less elastic and more vibration-damping effect. This would also achieve the desired improvement in the damping effect. Such a behavior can be achieved by using the compressibility of gases rather than the spring effect of elastic bodies such as rubber or the like, as was previously the case. Air in particular can be used here in a particularly simple design. A compressible chamber should therefore be arranged below the contact surface, which can be filled with a gas and thus provides the spring and damping effect via the compressibility of the gas.

A further problem of previously known tube catchers is the necessity of replacing the damping element when other glass tubes are used, in particular glass tubes with different diameters and thus different weights. This replacement is very time-consuming and considerably increases the commissioning time if the type of glass tube is changed. This problem can be solved in connection with the use of damping by gas pressure with respect to the tube catcher by the fact that it advantageously includes a pressure control device connected to the compressible chamber. The pressure regulating device can, for example, be designed as a pump with a pressure regulating valve and serves to adjust the pressure in the chamber and thus the damping characteristics at will. As far as the method is concerned, the problem is solved by the fact that filling with a gas advantageously comprises the adjustment of a predetermined pressure in the chamber, which is determined on the basis of the weight of the glass tube. This makes it particularly easy and very fast to adjust the tube catcher to different glass tube weights by simply adjusting the air pressure in the chamber.

In another advantageous design of the tube catcher, it has an outlet channel connected to the compressible chamber. Through this outlet channel the gas contained in the chamber can escape actively or under the external pressure of the weight of the tube from the chamber. Accordingly, regarding the method, it is advantageous the gas flows out of the chamber after the glass tube has been caught on the contact surface, e.g. by opening a valve. On the one hand, this allows the restoring force to be reduced during catching process, so that the elastic rebouncing described above is minimized. On the other hand, a defined end position can be reached, namely in a compressed state of the chamber. This further increases the positioning accuracy.

In a further advantageous design, several outlet channels with different diameters and different arrangements can be provided in such a way that a progressive damping characteristic is achieved during the reduction of the volume of the chamber during compression. For example, the compression can be accelerated or decelerated at a later point in time by a corresponding overlapping or release of channel inlets during compression by a corresponding arrangement of the walls.

With regard to the aforementioned aspect of positioning accuracy, the tube catcher in a particularly advantageous design comprises a fixing device which is designed to fix the contact surface in a compressed state of the chamber. I.e. either after the above described outflow of the gas or also during a defined point in time of the impact process, in which the chamber is compressed by the impulse of the glass tube, the contact surface is e.g. fixed mechanically at a given point, determining the positioning. With regard to the method, it is advantageous to fix the contact surface in a compressed state of the chamber after the glass tube has been caught on the contact surface.

Such a fixation can be achieved in a technically simple manner by using a magnet in the fixation device. This magnet can, for example, be arranged next to or in the chamber and attract and fix a ferromagnetic body connected to the contact surface by magnetic attraction. The fixing is therefore advantageously carried out by means of a magnet. Such a magnetic connection is easy to design, allows a strong, easy to release and at the same time fast and easy to activate/deactivate fixation. Herein, a switchable electromagnet can be used to selectively control the fixation of the contact surface. In a particularly simple design however, a permanent magnet can also be selected whose magnetic force is selected in such a way that the pressure in the chamber created when the gas cushion is built up is sufficient to overcome the holding force of the magnet. In the compressed, pressure-less state of the chamber, the magnet fixes the contact surface, and the pressure of the gas cushion releases the connection again.

A further aspect of the present disclosure, which can be explicitly claimed as an independent concept, independently of the design of the damping element with a gas-filled, compressible chamber described above, also by means of an independent patent claim, relates to a design of the tube catcher in such a way that the contact surface is fastened in the hot-forming machine so that it is further movable at least in the direction of the falling direction of the glass tube. With regard to the method, the contact surface is moved alternatively or in addition to filling the compressible chamber in the damping element with a gas after catching the glass tube on the contact surface, at least in the direction of the falling direction of the glass tube, wherein the glass tube is fixed beforehand by a holding chuck.

This aspect of the present disclosure concerns the problem that when the glass tube continues to cycle to the next position in the hot forming machine, its underside grinds over the contact surface after being caught. In extreme cases, the glass tube can break, so that the machine must be stopped and cleaned. Splinters of the glass tube can also break off and contaminate the machine. Conversely, the grinding of the glass tube on the tube catcher results in wear of the material of the contact surface and thus also wear of the damping material in one-piece versions of contact surface and damping element. It must therefore be replaced more frequently, which results in the machine having to come to a standstill.

These problems are solved by the above-described, independently claimable design, namely by first gripping the tube in the holding chuck, and after the tube is held in the holding chuck, the foot of the tube catcher together with the damping element and contact surface is moved away at least in the direction of the falling direction of the glass tube (i.e. in any direction with a movement component in the falling direction) before the tube moves sideways. In the configuration described above with a compressible chamber, this takes place during the compressed state of the chamber, i.e. in addition to the movement of the contact surface by the compression of the chamber, an additional mechanism is provided which allows further movement of the contact surface, e.g. by mechanically moving the foot of the tube catcher itself or by moving a retaining device of the contact surface in the chamber, so that the contact surface can be moved even further in the falling direction starting from the compressed state of the chamber. This separates the contact between the contact surface and the glass tube before the lateral movement and thus prevents wear.

A hot forming machine advantageously comprises a described tube catcher.

In an advantageous design, which however can also be claimed as an independent concept by means of an independent patent claim, completely independent of the design of the tube catcher described above, the hot forming machine comprises a rotatably arranged preloading rim with a plurality of radially symmetrically arranged loading positions for holding a vertically standing glass tube, wherein an individually openable holding device for the glass tube held in the respective loading position is provided in the preloading rim for each of the loading positions, and wherein an actuating device associated with the tube catcher is arranged in the hot forming machine, which actuating device is designed to open the holding device of that loading position, whose respectively held glass tube, in a given angular position of the preloading rim, is aligned with the contact surface of the tube catcher.

The above-mentioned design is based on the problem that a further increase in the cycle speed of a hot forming machine means that for mechanical reasons it is no longer possible to push the glass tube out of the preloading rim in one cycle step, i.e. at a single processing position, and immediately drop it through the opening onto the tube catcher. For this reason, a holding device is provided at every point in the preloading rim, which is arranged below the glass tube. In this way the glass tube is held and does not fall directly downwards. The glass tube can thus be brought into the loading position at a radially and temporally upstream position. Only at a later point in time is the holding device opened at a downstream position, under which the tube catcher is also arranged, so that the glass tube falls downwards onto the tube catcher. For this purpose, each of the holding devices is designed to be individually operable, but of course the actuation only has to take place above the tube catcher, which is why one actuating device is sufficient.

In the following, further designs of the hot forming machine described are explained, which are also independent of the design of the tube catcher described above. They may also be part of a patent claim which is directed exclusively at a hot forming machine, irrespective of the design of the tube catcher.

Preferably, the respective holding device comprises a holding plate pivotable under an opening and the actuating device comprises a slider whose movement pivots the holding plate away under the opening. Such a design is technically particularly easy to implement and is nevertheless suitable for holding the glass tube securely in the closed state. To open the holding mechanism, merely an e.g. pneumatically actuated slide must be arranged in such a way that it pushes away the holding plate on which the glass tube then stands.

In a further advantageous configuration, the preloading rim has a number of preloading positions for respectively holding a further glass tube, which number corresponds to the number of loading positions, each loading position being assigned a preloading position, a pushing device being provided in the hot forming machine which is designed to push a glass tube held in a preloading position at a given angular position of the preloading rim into the loading position assigned to this preloading position, the pushing device being arranged upstream of the actuating device in the direction of rotation of the preloading rim. A design of the preloading rim with preloading positions is generally known in the prior art. The tube is inserted into said rim at an angle radially outside the actual loading position and is not inserted until after the insertion process by means of an equally known pushing device. In the prior art, however, the glass tubes fall onto the tube catcher directly after the sliding process by the pushing device, which causes timing problems at higher clock rates, as explained above. In the described version with individual holding devices, on the other hand, pushing and falling can take place in two different cycles. For this purpose, the pushing device is mounted upstream of the actuating device in the direction of rotation of the preloading rim, i.e. a given radial position first reaches the pushing device during rotation, which normally pushes the glass tube inwards from the preloading position to the loading position, and only in a downstream cycle does the position then reach the actuating device, which opens the holding device, so that the glass tube falls downwards onto the tube catcher.

In a further advantageous configuration, a second actuating device is disposed in the hot forming machine, which is adapted to close the holding device in a given angular position of the preloading rim, wherein the second actuating device is disposed between the first actuating device and the pushing device in the direction of rotation of the preloading rim. In other words: Once the glass tube has been completely passed through the preloading rim for further processing, the respective position is made ready to receive a new glass tube. This can be done by the individual holding devices at any position, which is reached from a position of the preloading rim in a cycle following the opening, but before a cycle in which a new glass tube is slid over the holding device from the assigned preloading position.

The advantages achieved with the present disclosure are in particular that the design of a tube catcher of a hot forming machine for glass in the form of an air suspension achieves a particularly gentle damping. Cracks and stresses in the glass tube, which can have an influence on the finished product, are avoided. Due to the only slightly back oscillating suspension characteristic, especially in connection with a reduction of the air pressure by outflow of the gas during catching, a particularly precise vertical positioning of the tube is achieved. The exact positioning is further improved by a magnetic fixation of the contact surface.

Due to the separate design of contact surface and damping element in the form of a compressible, gas-filled chamber, the material for the contact surface can be freely selected in contrast to previous one-piece designs. The material of the contact surface itself no longer needs to have any damping properties and can instead be selected according to other criteria such as abrasion resistance. Thus, polyoxymethylene (POM) can be used advantageously for the contact surface.

In addition, an air suspension in connection with an adjustable gas pressure in the chamber is particularly easy to adjust to the various weights of glass tubes with different diameters. This reduces the maintenance time when changing the hot forming machine to other tube diameters.

The above-described design of a preloading rim with individual holding devices in the loading positions of the glass tubes makes it possible to push the glass tube from a preloading position into the loading position and to drop the glass tube onto the tube catcher in different radial positions and cycles of the machine. This makes the hot forming machine suitable for higher cycle rates.

BRIEF DESCRIPTION OF THE DRAWINGS

Embodiments of the present disclosure are explained in more detail using drawings in which.

DETAILED DESCRIPTION OF THE DISCLOSURE

Identical parts have the same reference signs in all drawings.

Figure 1:
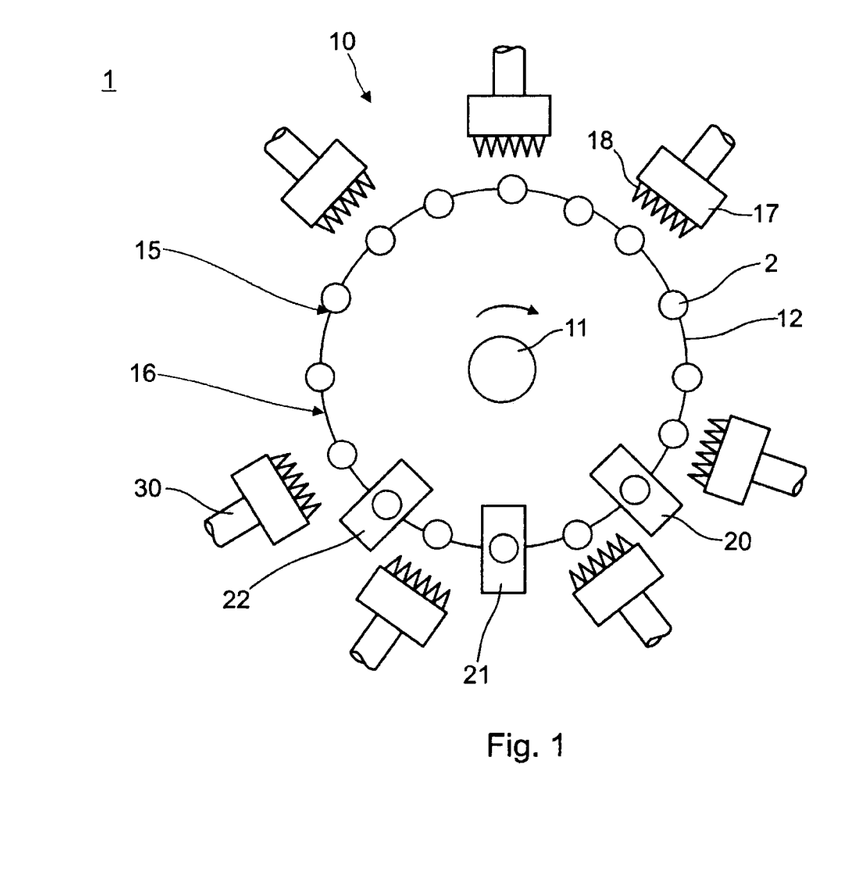
FIG. 1 shows a schematic view of parts of a hot forming machine.

FIG. 1 shows in a schematic view the basic structure of a hot forming machine 1, which is used for the production of glass containers from a glass tube 2, which is fed vertically aligned from above. The glass containers to be produced, for example glass vials, cartridges or syringes, are used to store pharmaceutical active ingredients. The hot forming machine 1 comprises a so-called mother machine 10, which serves in particular for hot forming of the supplied glass tube 2 at an end opposite the later bottom or open end of the glass container, in particular for forming a neck with a neck opening.

Glass tubes 2 are fed at feed position 15 from a preloading rim not shown in FIG. 1. They fall down by opening a holding device in the preloading rim, are caught by a tube catcher to be described below and are then held in holding chucks at a suitable machining height, which are distributed over the circumference of a rotary table 12. The turntable 12 is designed in the form of a turnable rim with holding chucks and is mounted on the associated column 11 so that it can rotate. The turntable 12 is rotated or swiveled step by step around the assigned column 11. The glass tubes 2 held on the holding chucks are guided step by step past gas burners 17 and various processing stations 20-22, at which the processing and hot forming of the glass containers takes place during a respective standstill time.

After passing through the processing stations 20-22, the glass containers are inspected non-tactile at least in the area of the neck and the neck opening with the aid of an inspection system 30 and their properties are documented. The inspection system 30 can, for example, be a video camera with image evaluation software, with which geometric dimensions of the glass containers are evaluated on the basis of the images recorded by the video camera, for example the geometric dimensions in the case of glass vials. Finally, the glass containers are transferred to a downstream processing machine at position 16.

Figure 2A:
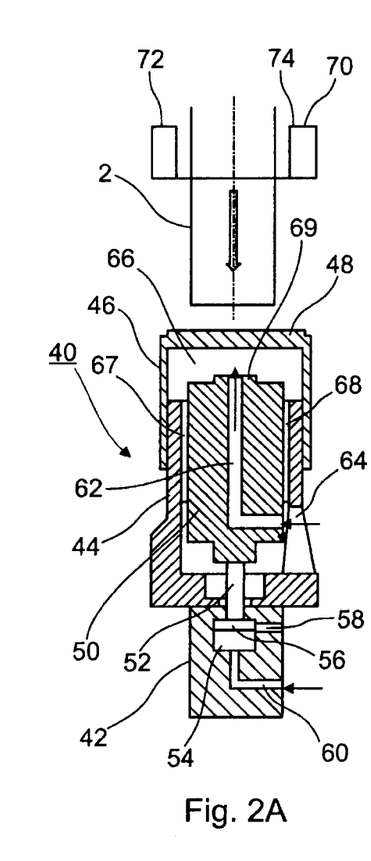
FIGS. 2a-2d show a chronological sequence of the catching process of the tube catcher.
Figure 2B:
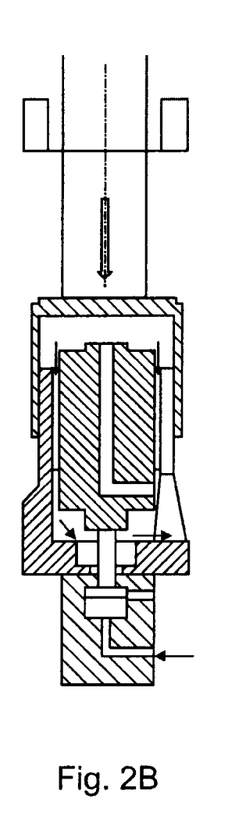
Figure 2C:
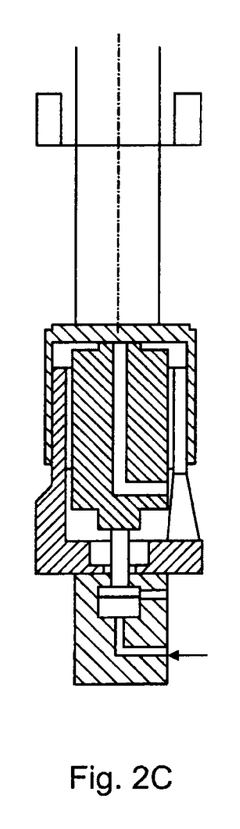
Figure 2D:
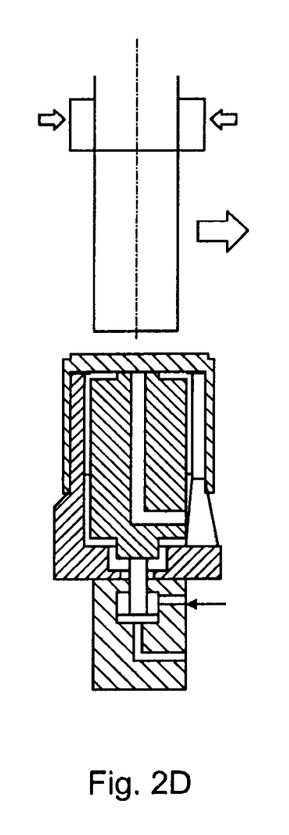

FIGS. 2a-d show a time sequence of the catching of the glass tube 2 by a tube catcher 40 after dropping from the preloading rim, as described above. FIGS. 2a-d show a view from the radial direction of FIG. 1, where the tube catcher 40 is shown in section. For reasons of clarity, only FIG. 2a is provided with reference signs, since the FIGS. 2b-d show the same tube catcher 40 only at other times of the catching process. First, the structure of the tube catcher 40 is explained and then the chronological sequence of the catching process is described.

The tube catcher 40 has a foot 42, with which it is fixed in the hot forming machine 1, as will be described further with regard to FIG. 4. At foot 42, concentrically to the glass tube 2, an upwardly open cylinder pot 44 is arranged. A cylindrical sleeve 46, which is also cylindrical and closed at the top, is placed on the cylinder pot 44 and dimensioned flush with the outer wall of the cylinder pot 44. The lid of the sleeve 46, which is closed at the top, forms a flat contact surface 48, on which the glass tube 2 hits when falling down from the preloading rim. The contact surface 48 itself is made of a material or coated with a material which is particularly optimized with regard to its abrasion resistance, in the example POM.

A piston 50 is concentrically arranged inside the cylinder bowl 44. Although it is cylindrical, its outer diameter is slightly smaller than the inner diameter of the cylinder bowl 44. Instead, the piston 50 is guided through a piston rod 52 which pushes through the bottom of the cylinder pot 44 so that it can only move in the vertical direction. At foot 42, the piston rod 52 leads into a cylindrical chamber 54, where it is connected to a concentrically arranged circular disc 56, the diameter of which corresponds to the diameter of chamber 54. The piston rod 52 can thus be moved in the axial direction until the disc 56 touches one of the axial boundary surfaces of chamber 54. Two air supply lines 58, 60 are arranged at foot 42, of which the first air supply line 58 leads into the area of the lid of chamber 54, the other into the center of the bottom of chamber 54. The air supply lines 58, 60 can be supplied with compressed air from outside the foot 42. Due to the described geometry, the air supply line 58 opens above the disc 56 into the chamber 54, so that the disc 56, and thus the piston 50, is pressed downwards by the pressure of the air supply line 58 until the disc 56 hits the bottom of the chamber 54. Conversely, by applying pressure to the air supply line 60, which opens into the bottom of chamber 54, the disc 56 and thus the piston 50 is pressed upwards until the disc 56 touches the cover of chamber 54.

A further air supply line 62 is arranged in the axis of the piston 50, which opens out below the sleeve 46 and can be supplied with compressed air laterally through an opening 64 in the wall of the cylinder pot 44. The corresponding pneumatic equipment such as pumps, hoses and valves are not shown in the drawings. However, they are available and can be controlled as required by control electronics. In particular, the supply line 62 can be supplied with compressed air in an adjustable manner so that a defined pressure can be set in the chamber 66 formed above the piston 50 and delimited above and radially by the sleeve 46. The space between the outer diameter of the piston 50 and the inner diameter of the cylinder pot 44 forms outlet channels 67, 68 through which compressed air can escape from chamber 66. The adjustment of a certain pressure in chamber 66 therefore requires a constant supply of air through the air supply line 62, and in other design examples not shown, the outlet ducts 67, 68 may be more complex, e.g. several outlet ducts with different diameters or with varying cross-sections depending on the axial position (e.g. by a conical design of piston 50 and inside of cylinder bowl 44 or by further outlet channels which do not extend over the entire height), so that a progressive damping characteristic is achieved.

A magnet 69 is arranged at the outlet of the air supply line 62, which is designed as a permanent magnet and whose strength is selected such that the pressure of the air cushion in the chamber 66 is sufficient to release the magnetic connection as required. The inside of the cover of the sleeve 46 is ferromagnetic above the magnet 69, so that when the chamber 66 is compressed it sticks to the magnet 69 at a sufficiently small distance. In addition, a chuck 70 is arranged above the tube catcher 40 in the hot forming machine 1 as already described for FIG. 1, which is also controlled by the control electronics as required in order to grip and hold the glass tube by means of the clamping jaws 72, 74 of the chuck 70.

After only the construction of the tube catcher 40 and the holding chuck 70 arranged above it has been described, the sequence of the catching process is explained in the following using FIGS. 2a-d. In a first phase, shown in FIG. 2a, air is supplied through the air supply line 60 so that the piston 50 is fixed in an upper position. Air with a defined air volume is also supplied through the air supply line 60, so that a specified pressure is set in chamber 66. This pressure is determined by the tube weight of the glass tube 2 and can be adjusted to different tube weights. In the FIG. 2a phase, the pressure in chamber 66 is sufficient to release the cover from magnet 69 and the jaws 70, 72 are open. The glass tube 2 falls down in the direction of the contact surface 48.

In the following only changes of the control variables are described for the FIGS. 2b-d. Control variables not described remain unchanged.

In FIG. 2b, the glass tube 2 hits the contact surface 48, which is compressed by the elasticity of the air in the chamber 66, so that the fall of the glass tube 2 is gently slowed down by the elastic receding of the contact surface 48. At this point, the air supply through the air supply duct 60 is also terminated, so that the pressure in chamber 66 drops even further and chamber 66 is further compressed, as the remaining air escapes through the outlet ducts 67, 68. The final state of compression is shown in FIG. 2c when the cover of the sleeve 46 hits the top of the piston 50. The compression of chamber 66 is then at maximum. The magnet 69 fixes the cover of the sleeve 46 with the contact surface 48 on the piston 50.

In the state shown in FIG. 2c, the glass tube 2 has a defined vertical position. The next step is to close the clamping jaws 70, 72 so that the glass tube 2 is gripped for further processing in the hot forming machine 1. The air supply to the air supply line 60 is then terminated and air is led into the air supply line 58 instead. This causes the piston 50 to sink, initially under the influence of gravity, then also downwards due to the pressure existing above the disc 56 in chamber 54. Since the magnet 69 fixes the cover, the piston 50 also moves the sleeve 46 and thus the contact surface 48 downwards. Since the glass tube 2 is held by the holding chuck 70, the contact surface 48 moves away from the glass tube 2 in the falling direction of the glass tube 2. The glass tube 2 is then moved radially in the hot forming machine to the other processing stations in the manner described for FIG. 1. The air supply to the air supply lines 60, 62 is reactivated as before, so that chamber 66 expands again. The tube catcher 50 is now ready to catch the next tube.

Figure 3:
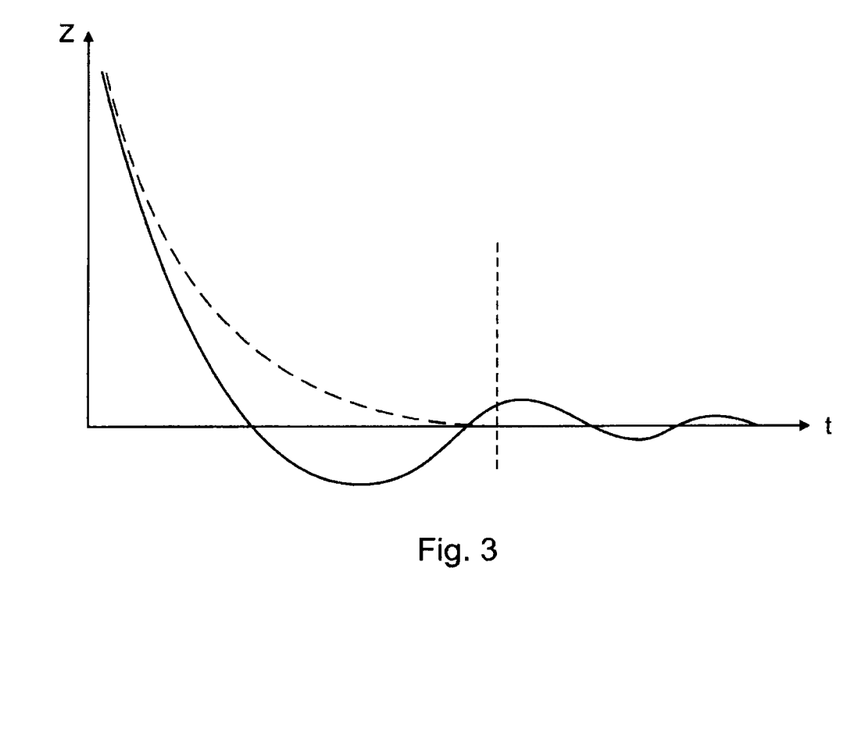
FIG. 3 shows a schematic diagram of the vertical position of the tube catcher during the catching process, plotted against time in comparison with the state of the art.

FIG. 3 shows the vertical position of the glass tube 2 during the collection process described above compared to the prior art, applied against time. The solid line shows the vertical position of the glass tube 2 in prior art catching processes, e.g. by a contact surface and a damper made of a rubber-like material. This material bounces back so that the vertical position oscillates around the end position with gradually decreasing amplitude. In contrast, the dashed line shows the course of the vertical position after the catching process described in FIGS. 2a-d. This runs strictly monotonously and asymptotically up to a resting position, which is also reached much earlier than in the prior art.

Figure 4:
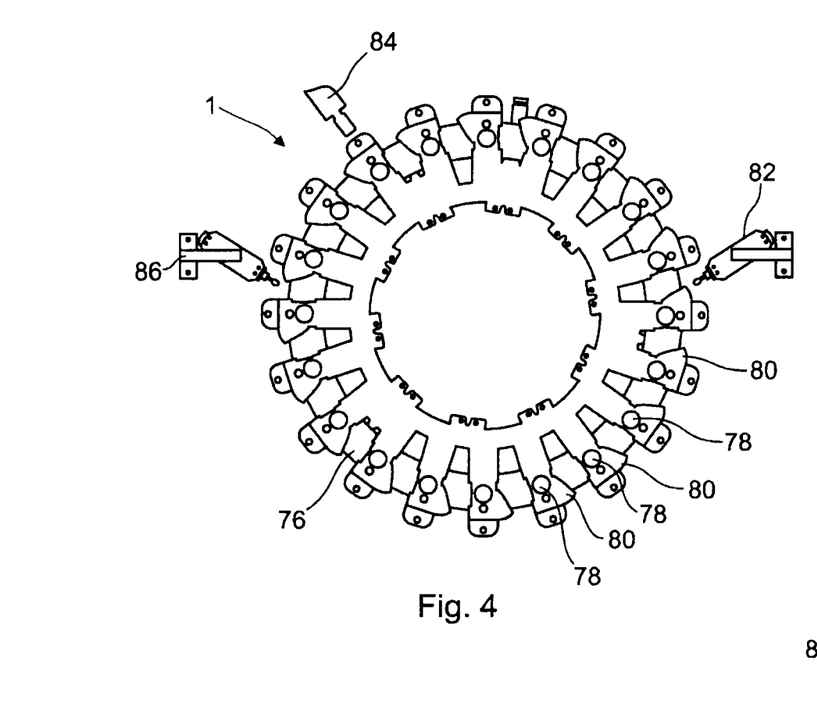
FIG. 4 shows a schematic view of parts of the lower preloading rim of the hot forming machine from below.

FIG. 4 finally shows a lower preloading rim 76 of a hot forming machine 1. The preloading rim 76 according to FIG. 4 has a 20-fold radial symmetry, i.e. it is designed for a hot forming machine with twenty processing positions, in contrast to the hot forming machine 1 according to FIG. 1, which has sixteen processing positions. On the shown preloading rim 76 a preloading position and a loading position for a glass tube 2 are defined in each of the twenty positions, which will be explained in more detail referring FIGS. 7a-c. In the loading position, the vertical glass tube 2 is aligned with one of the twenty openings 78, each of which is part of one of the twenty individually operated holding devices 80. FIG. 4 shows the preloading rim 76 from below; the function of the holding devices 80 and their actuation is explained in FIGS. 5 and 6.

In FIG. 4 the holding devices 80 are all open so that the openings 78 are visible. The preloading rim 76 is designed for counterclockwise rotation (seen from below in FIG. 4). A given opening 78 and holding device 80 first passes a non-rotating actuating device 82 which is fixed in the hot forming machine 1 and closes the respective holding device 80, as described referring to FIG. 5. After a few steps, the respective holding device 80 then reaches a position in which a pushing device 84 is arranged, which pushes a glass tube 2 from a pre-loading position inwards into the loading position, so that the glass tube 2 stands vertically above the holding device 80 in the now closed opening 78.

Only a few cycles later, after the preloading rim has been moved three positions further, does the respective holding device 80 reach a position in which a further actuating device 86 is arranged, which opens the respective holding device 80, as described for FIG. 6. The glass tube 2 then falls through the opening 78 in the manner already described for FIG. 2 onto the tube catcher 40, or—in other design examples—onto another tube catcher as known from the prior art.

Figure 5:
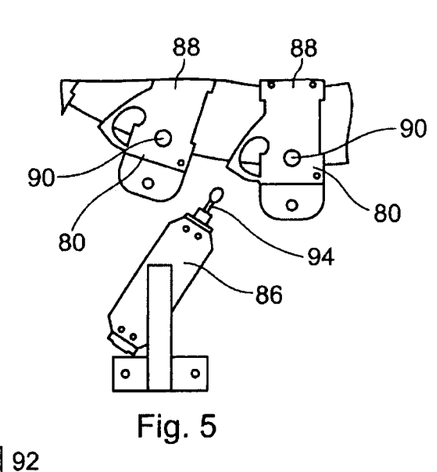
FIG. 5 shows a cutout of FIG. 4 with closed holding devices.
Figure 6:
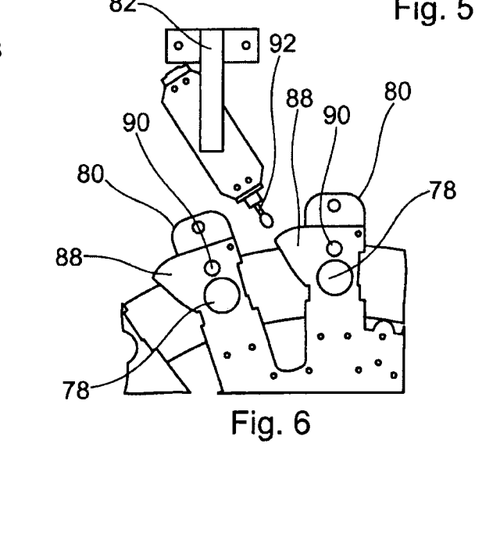
FIG. 6 shows a cutout of FIG. 4 with open holding devices.

FIGS. 5 and 6 each show a cutout of the FIG. 4, FIG. 5 in the area of the actuating device 86, FIG. 6 in the area of the actuating device 82. As can be seen in FIGS. 5 and 6, each holding device 80 comprises a holding plate 88, each of which is pivotally mounted about one axis 90, respectively. The retaining plate 88 has a circular opening which is aligned with the respective opening 78 in the open position of the retaining plate 88 in FIG. 6. In the closed position of the support plate 88 shown in FIG. 5, the support plate 88 closes the opening 78. Each of the actuating devices 82, 86 comprises a pneumatically actuated slider 92, 94 which are each arranged to push against the support plate 88 on different sides and thus move it into the open or closed position.

Figure 7A:
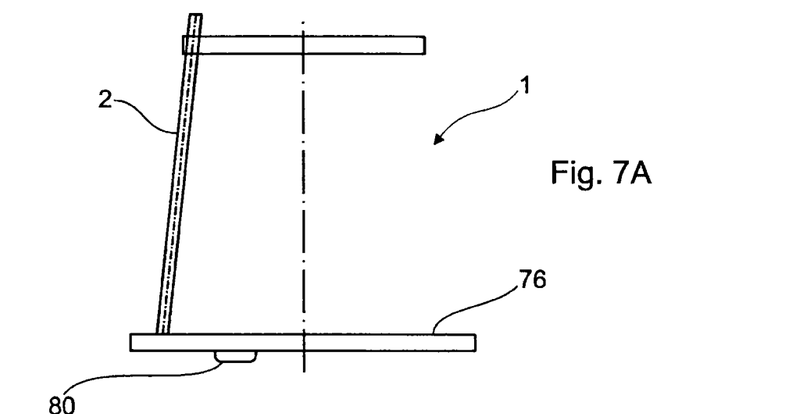
FIGS. 7a-c show a chronological sequence of the pushing process from a preloading position to a loading position in lateral view.
Figure 7B:
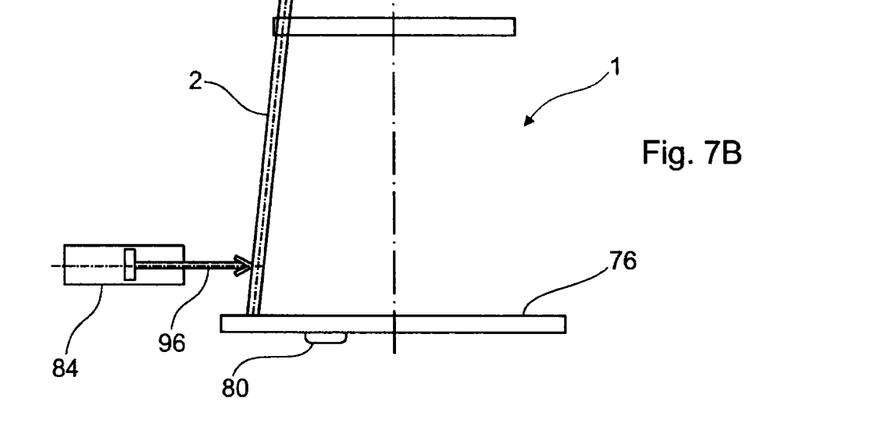
Figure 7C:
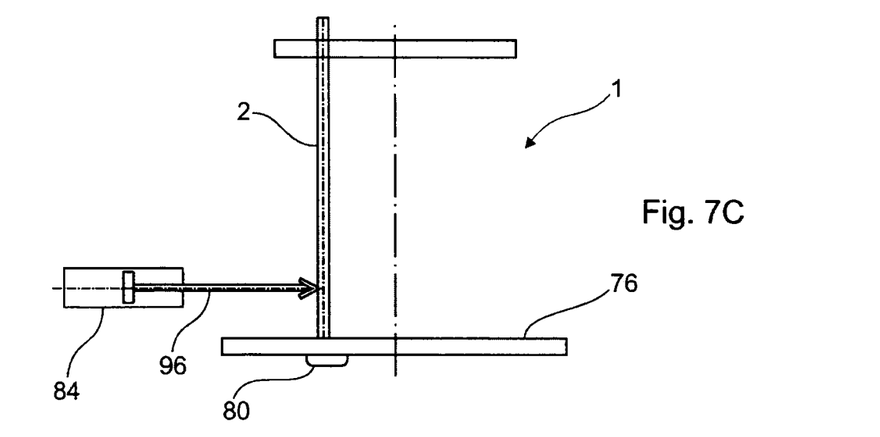

Finally, the FIGS. 7a-c show in a lateral view the process of pushing the glass tube 2 from the preloading position into the loading position, as explained above. FIGS. 7a-c show a schematic side view of the upper part of the hot forming machine 1. In FIG. 7a the glass tube 2 is inclined in a radially outward preloading position. In FIG. 7b, the preloading rim reaches the position in which the pushing device 84 is arranged in a given cycle. This has a slider 96, which is exactly radially aligned inwards and—also pneumatically actuated—pushes the glass tube 4 onto the holding device 80 into a loading position, as shown in FIG. 7c. At a later time in a later rotation cycle, the holding device 80 is then opened, as described above.

In versions of the present disclosure, hot forming machine 1 described for FIG. 1 and FIGS. 4-7c may also be equipped with a prior art tube catcher which is not designed in accordance with the version according to FIG. 2.

LIST OF REFERENCE SIGNS

1 Hot forming machine
2 Glass tube or semi-finished intermediate product
5 Vial
6 Cylindrical side wall
7 Shoulder
8 Neck
9 Roller edge
10 Mother machine
11 Pillar with drive
12 Turntable
15 Feed section
16 Transfer section
17 Gas burner
18 Burner flame
20 First hot forming section
21 Second hot forming section
22 Third hot forming section
30 Non-tactile inspection system, e.g. video camera
40 Tube catcher
42 Foot
44 Cylinder pot
46 Sleeve
48 Contact surface
50 Piston
52 Piston rod
54 Chamber
56 Disc
58, 60, 62 Air supply line
64 Opening
66 Chamber
67, 68 Outlet channel
69 Magnet
70 Holding chuck
72, 74 Clamping jaws
76 Lower preloading rim
78 Opening
80 Holding device
82 Actuating device
84 Pushing device
86 Actuating device
88 Holder plate
90 Axis
92, 94, 96 Slider

What is claimed is:

1. A tube catcher for a hot forming machine, comprising:
 a foot for mounting the tube catcher in the hot forming machine;
 an upper contact surface for catching a glass tube as the glass tube falls along a falling direction into the hot forming machine; and
 a damping element arranged below the upper contact surface in such a way that it allows the upper contact surface to elastically recede in a direction of the falling direction of the glass tube,
 wherein the damping element comprises a compressible chamber which can be filled with a gas.

2. The tube catcher of claim 1, further comprising a pressure control device connected to the compressible chamber.

3. The tube catcher of claim 1, further comprising an outlet channel connected to the compressible chamber.

4. The tube catcher of claim 1, further comprising a magnet adapted to fix the upper contact surface in a compressed state of the compressible chamber.

5. The tube catcher of claim 1, wherein, when the compressible chamber is in a compressed state, the upper contact surface is fixed in the hot forming machine such that it is further movable at least in the direction of the falling direction of the glass tube.

6. A hot forming machine with a tube catcher according to claim 1.

7. The hot forming machine of claim 6, further comprising:
 a rotatably arranged preloading rim with a plurality of radially symmetrically arranged loading positions, wherein each of the plurality of radially symmetrically arranged loading positions holds a vertically standing glass tube;
 a plurality of individually openable rotatably mounted plates, one for each of the plurality of radially symmetrically arranged loading positions; and
 an actuating slider associated with the tube catcher in the hot forming machine,
 wherein the actuating slider opens the plurality of individually openable rotatably mounted plates of one of the plurality of radially symmetrically arranged loading positions, when the glass tube in the one of the plurality of radially symmetrically arranged loading positions, in a given angular position of the preloading rim, is aligned with the upper contact surface of the tube catcher.

8. The hot forming machine of claim 7, wherein the each of the plurality of individually openable rotatably mounted plates comprises a holding plate pivotable under an opening and the actuating slider has a movement that pivots the holding plate away under the opening.

9. The hot forming machine of claim 7, wherein the preloading rim has a number of preloading positions for respectively holding an additional glass tube, wherein the number of preloading positions corresponds to a number of the plurality of radially symmetrically arranged loading positions, and each of the plurality of radially symmetrically arranged loading positions has a corresponding preloading position, and the hot forming machine further comprises;
 a pushing slider that pushes a glass tube held in a preloading position at a given angular position of the preloading rim into a corresponding radially symmetrically arranged loading position associated with the corresponding preloading position, and the pushing slider is upstream of the actuating slider in a direction of rotation of the preloading rim.

10. The hot forming machine of claim 9, further comprising a second actuating slider adapted to close the plurality of individually openable rotatably mounted plates holding device at a given angular position of the preloading rim,
 wherein the second actuating slider is between the actuating slider and the pushing slider in the direction of rotation of the preloading rim.

11. A method for catching a glass tube in a hot forming machine with the tube catcher of claim 1, comprising the steps of:
 arranging the upper contact surface and the damping element so that it allows the upper contact surface to elastically recede in the direction of the falling direction of the glass tube, below the glass tube;
 filling the compressible chamber in the damping element with the gas; and
 dropping the glass tube.

12. The method of claim 11,
 wherein the filling step comprises adjusting a predetermined pressure in the compressible chamber, which is determined from the weight of the glass tube.

13. The method of claim 11, further comprising the steps of:
 catching the glass tube on the upper contact surface; and
 after the catching step, causing gas to flow out of the compressible chamber.

14. The method of claim 11, further comprising the steps of:
 catching the glass tube on the upper contact surface; and
 after the catching step, fixing the upper contact surface in a compressed state of the compressible chamber.

15. The method according to claim 14, wherein the fixing step is carried out with a magnet.

16. The method according to claim 11, further comprising the step of catching the glass tube on the upper contact surface, wherein, when the compressible chamber is in a compressed state, the upper contact surface elastically recedes further at least in the direction of the falling direction of the glass tube after the glass tube has been caught on the upper contact surface, and wherein the glass tube is fixed beforehand by a holding chuck.

* * * * *